United States Patent
Meyers

(10) Patent No.: US 6,319,403 B1
(45) Date of Patent: Nov. 20, 2001

(54) EFFLUENT FILTER FOR SEPTIC TANKS AND OTHER ON-SITE WASTE DISPOSAL SYSTEMS

(75) Inventor: Theodore W. Meyers, Barrington, IL (US)

(73) Assignee: Tuf-Tite, Inc., Wauconda, IL (US)

(*) Notice: Subject to any disclaimer, the term of this patent is extended or adjusted under 35 U.S.C. 154(b) by 0 days.

(21) Appl. No.: 09/338,371

(22) Filed: Jun. 23, 1999

(51) Int. Cl.$^7$ .................................................. B01D 25/02
(52) U.S. Cl. .......................... 210/336; 210/450; 210/470; 210/532.2
(58) Field of Search .................................... 210/170, 435, 210/532.2, 460, 172, 470, 237, 336, 450, 498

(56) References Cited

U.S. PATENT DOCUMENTS

| | | |
|---|---|---|
| D. 116,209 | 8/1939 | Kornegg . |
| D. 386,241 | 11/1997 | Nurse, Jr. .......................... D23/209 |
| D. 402,349 | 12/1998 | Gavin ................................. D23/209 |
| D. 406,314 | 3/1999 | Denkewicz et al. ................. D23/209 |
| 1,536,911 | 5/1925 | Nugent . |
| 3,332,552 | 7/1967 | Zabel . |
| 4,439,323 | 3/1984 | Ball ..................................... 210/608 |
| 4,710,295 | * 12/1987 | Zabel .................................. 210/336 |
| 4,992,165 | 2/1991 | Jensen ................................. 210/124 |
| 5,223,154 | 6/1993 | MacPherson, Jr. et al. .......... 210/790 |
| 5,264,120 | 11/1993 | Graves ................................ 210/109 |
| 5,382,357 | 1/1995 | Nurse .................................. 210/170 |
| 5,413,706 | 5/1995 | Graves ................................ 210/110 |
| 5,427,679 | 6/1995 | Daniels ............................... 210/170 |

(List continued on next page.)

FOREIGN PATENT DOCUMENTS

| 2011975 | 7/1979 | (GB) . |
|---|---|---|
| 7900528 | 1/1979 | (NL) . |

OTHER PUBLICATIONS

Applicant's co-pending design patent application 29/106,880, filed Jun. 23, 1999.

"The Zabel Zone" catalog, Fall '98, p. 46, was published in Sep., 1998 (and showing products believed to be on sale or in public use prior to Jun. 23, 1998).

Orenco Systems Incorporated (OSI) Biotube Effluent Filter "Pure Performance" product brochure, published before Nov. 1, 1995.

Primary Examiner—David A. Simmons
Assistant Examiner—Frank M. Lawrence
(74) Attorney, Agent, or Firm—Marshall, Gerstein & Borun

(57) ABSTRACT

An effluent filter for septic tanks and the like has substantially horizontal filtering levels provided in a stepped arrangement on both an inlet side and an outlet side of the effluent filter. The effluent filter provides an array of both substantially horizontal and vertical filtering slits through which effluent must pass to reach the outlet side and exit the septic system. Particles in the effluent must navigate tortuous paths created by the array of filtering slits and are trapped by these filtering slits, rather than being allowed to exit the septic system with the filtered effluent. The effluent filter is flexible and is further provided with integral external flexible wiper blades that serve to improve a friction fit between the effluent filter and an associated T baffle, sanitary T baffle, or other pipe component, as well as prevent particles in the effluent from circumventing the effluent filter. The longevity between cleanings of the effluent filter is increased by integral means in both the upper and lower filtering zones for effluent to circumvent individual filtering layers as they become clogged with debris or slimed over, while redirecting the effluent to other non-clogged filtering levels of the effluent filter.

36 Claims, 7 Drawing Sheets

U.S. PATENT DOCUMENTS

| | | | |
|---|---|---|---|
| 5,429,752 | 7/1995 | Presby | 210/802 |
| 5,476,582 | 12/1995 | Camping | 210/85 |
| 5,482,621 | 1/1996 | Nurse | 210/170 |
| 5,492,635 | 2/1996 | Ball | 210/802 |
| 5,531,894 | 7/1996 | Ball et al. | 210/605 |
| 5,569,387 | 10/1996 | Bowne et al. | 210/754 |
| 5,580,453 * | 12/1996 | Nurse, Jr | 210/323.2 |
| 5,582,716 | 12/1996 | Nurse, Jr. | 210/121 |
| 5,591,331 | 1/1997 | Nurse, Jr. | 210/232 |
| 5,593,584 | 1/1997 | Nurse, Jr. | 210/346 |
| 5,635,064 | 6/1997 | Bovington | 210/338 |
| 5,667,689 | 9/1997 | Graves | 210/621 |
| 5,683,577 | 11/1997 | Nurse, Jr. | 210/170 |
| 5,736,035 | 4/1998 | Nurse, Jr. | 210/172 |
| 5,759,393 | 6/1998 | Nurse, Jr. | 200/232 |
| 5,762,790 | 6/1998 | Zoeller | 210/238 |
| 5,762,793 | 6/1998 | Nurse, Jr. | 210/323.2 |
| 5,779,896 | 7/1998 | Nurse, Jr. | 210/299 |
| 5,795,472 | 8/1998 | Nurse, Jr. | 210/232 |
| 5,871,640 | 2/1999 | Gavin | 210/123 |
| 5,885,452 | 3/1999 | Koteskey | 210/309 |
| 5,958,239 | 9/1999 | Sing | 210/605 |
| 6,024,870 * | 2/2000 | Thompson | 210/532.2 |

* cited by examiner

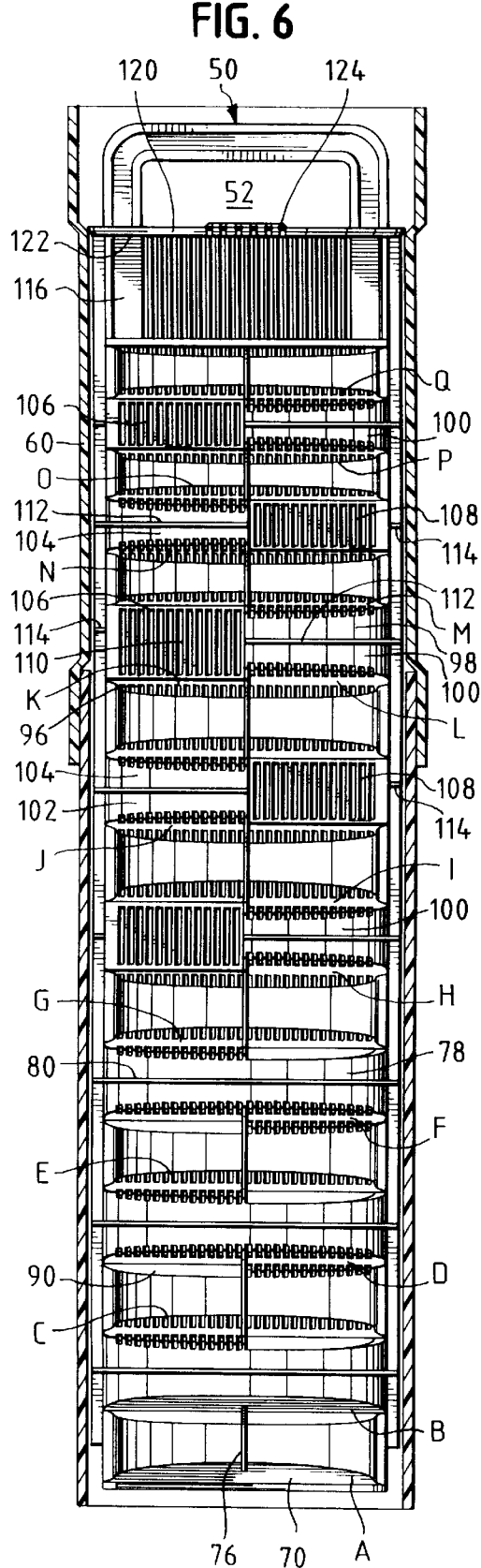
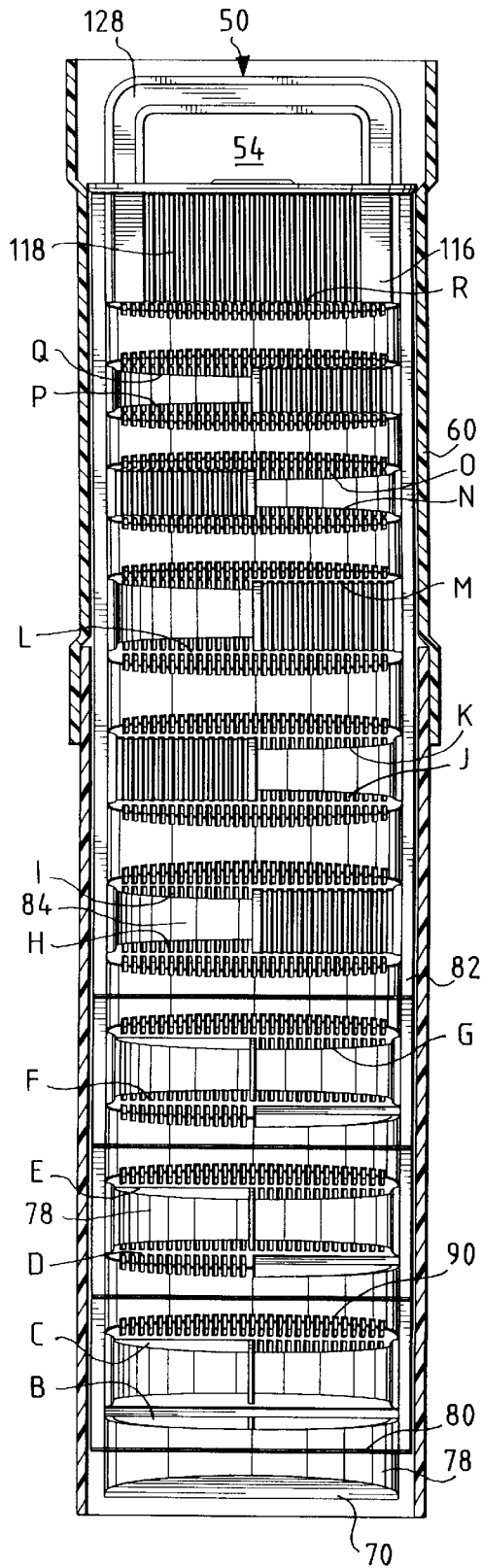

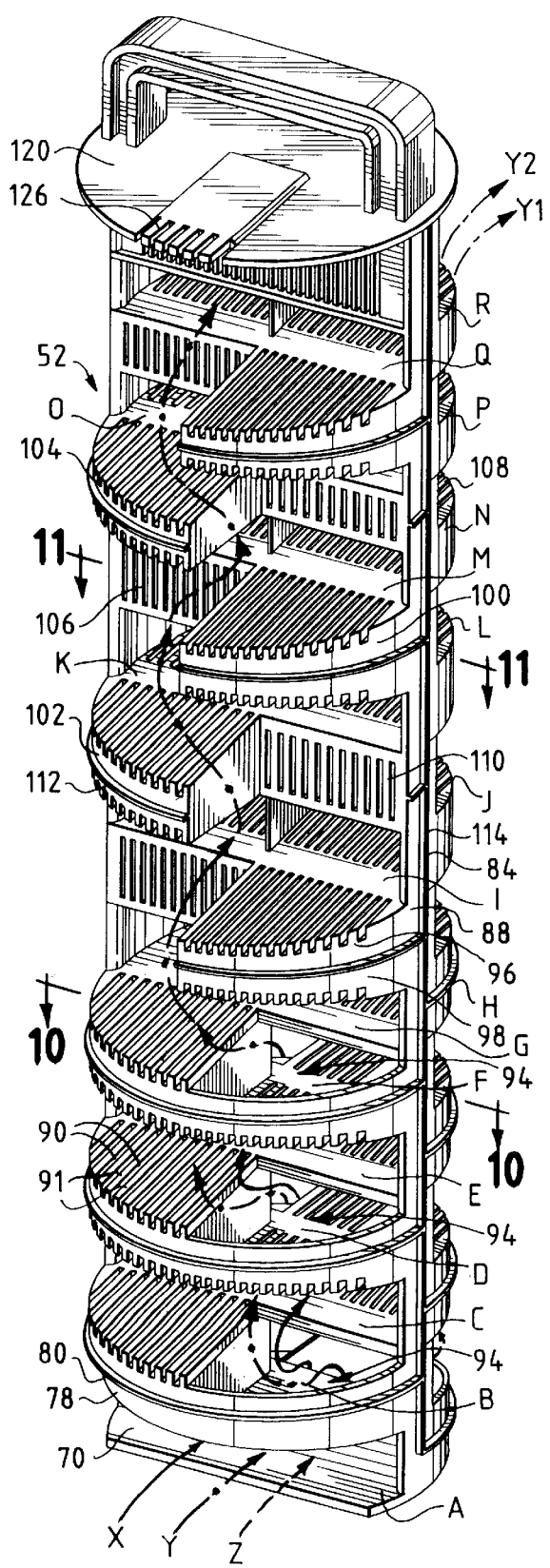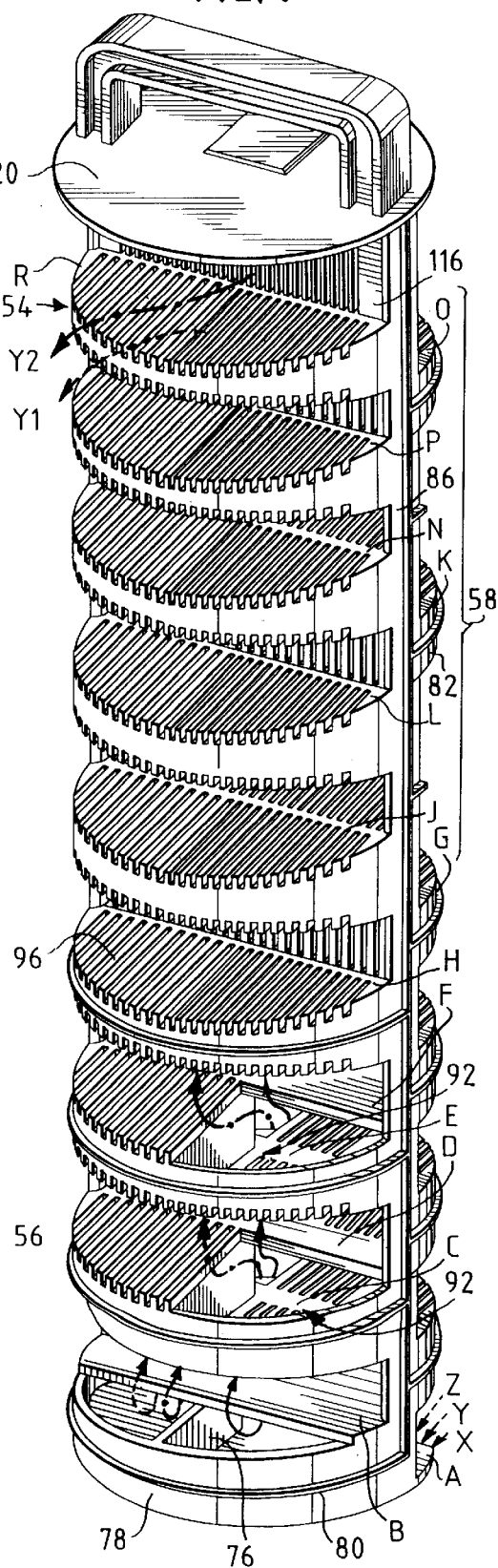

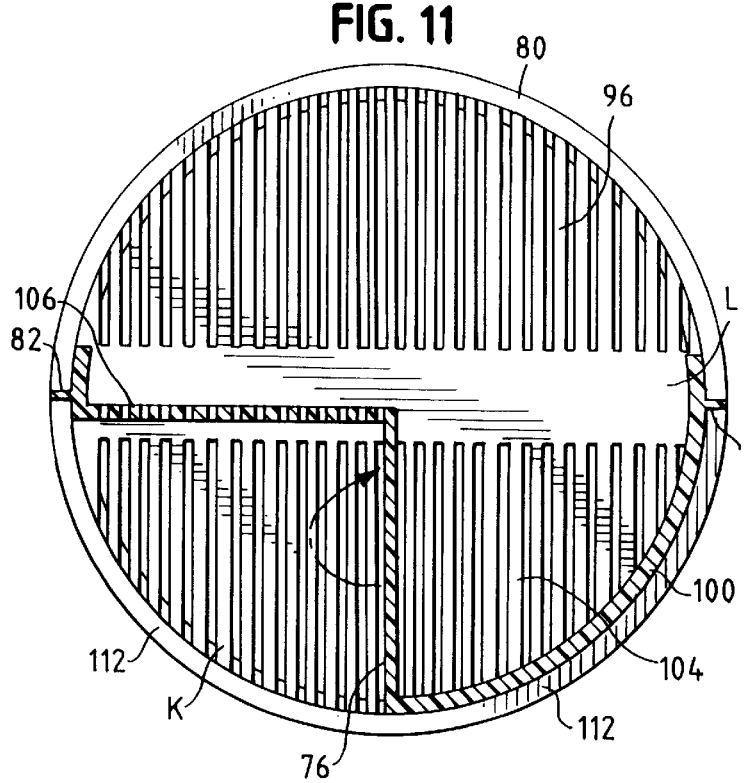
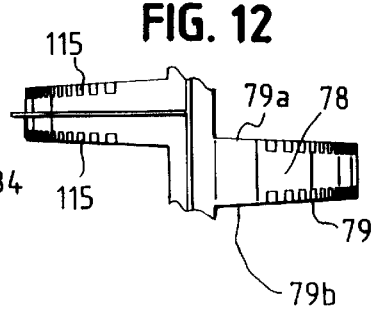
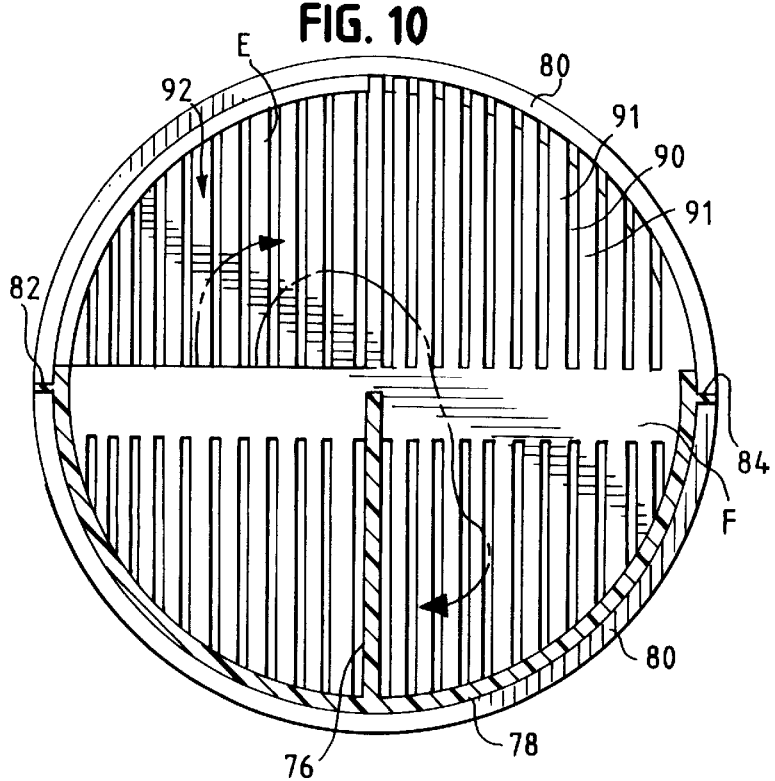
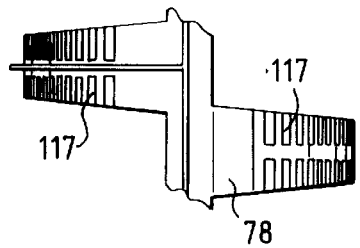

EFFLUENT FILTER FOR SEPTIC TANKS AND OTHER ON-SITE WASTE DISPOSAL SYSTEMS

BACKGROUND

1. Field of the Invention

This invention relates generally to effluent filters for use in septic tank and other on-site waste disposal systems and, more specifically, to an effluent filter of increased longevity, having a stepped inlet side and a stepped outlet side that define a lower first filter zone and an upper second filter zone, to prevent particles from passing through the effluent filter on the outlet side.

2. Description of the Prior Art

Many homes, parks, and commercial developments throughout the United States lack municipal sewer services due to their remote locations, or owner preference. Instead, such locations utilize on-site waste and septic tank systems for their sewage disposal needs. Septic tanks include at least one entry port to accept sewage waste from a nearby home or commercial structure, and at least one effluent port. The septic tank typically holds an upper scum layer, an intermediate liquid effluent layer called the clear zone, and a lower sludge layer. Grease, fats, oils and floatables are typically found in the scum layer. The sludge layer is where most of the solid waste products collect and biologically decompose.

Particles from the sludge layer tend to float up into the clear zone, in part because the specific gravity of most such particles is less than 1. There have been many past attempts to design effluent filters to filter these particles out of the liquid effluent before the effluent is discharged from the septic tank. All such prior art effluent filters have been, in effect, "one-pass" filters, in that there is basically only one opportunity for particles to be caught in slits, holes, or mesh of the filter before the effluent is discharged from the septic tank.

An example of a first type of one-pass effluent filter is shown in U.S. Pat. No. 5,382,357. This effluent filter includes a tubular element having many slots therein to trap particles that are floating in the liquid effluent. The tubular element is disposed entirely within a standard T baffle (also called a pipe T) of a septic tank, or at least entirely within a vertical length of pipe extending from the T baffle. The tubular is element has an open lowermost end. A separate sealing gasket is provided at the bottom of the tubular element to provide a seal between the outer wall of the tubular element and the inner wall of the T baffle. The effluent is intended to be forced to flow into an open lower end of the T baffle or the vertical length of pipe associated with the T baffle, and into the open lowermost end of the tubular element of the effluent filter. In order for the effluent to reach the outlet port of the T baffle and thereafter be drained away from the septic tank, the effluent must first pass through the slots of the tubular element, i.e. from inside to outside the effluent filter. The slots are sized so that particles of at least about $\frac{1}{16}$th inch are caught by the slots, and thereby filtered out of the effluent.

The integrity of the seal between the tubular element and the wall is dependent upon the precision of the diameter and shape of both the T baffle and the tubular element at a single specific region of the tubular element. If, for example, the T baffle is slightly out-of-round at the particular point at which the sealing gasket is intended to interface with the vertical portion of the inner wall of the T baffle, the effluent filter can be bypassed entirely by the particles in the effluent, rendering the filter virtually useless. This is because there is only a single annular gasket provided on the tubular element to provide a seal between the inner wall of the T baffle and the tubular element. If the gasket does not form a sufficiently tight seal, which can occur if either the T baffle or the underlying portion of the tubular element is out of round at the point of interface, particles will circumvent the effluent filter altogether. Also, an extra manufacturing step is necessary to install the separate sealing gasket onto the bottom end of the tubular element.

Another type of one-pass effluent filter is shown in U.S. Pat. No. 5,569,387. In this effluent filter, an elongated tubular element having slots therein is provided in a sanitary T baffle (also called a sanitary T, or a sweep T baffle). The elongated tubular element extends significantly below the lower end of the sanitary T baffle or any vertical pipe associated with the sanitary T baffle. Although not described in detail in the patent, a sealing gasket or ring is typically provided on the exterior of the elongated tubular element below the outlet port of the sanitary T baffle to provide a seal between the outer wall of the elongated tubular element and the inner wall of the sanitary T baffle. Above this sealing gasket, there are no slots in the elongated tubular element. Instead, there are openings in the wall of the elongated tubular element to permit filtered effluent to pass from inside the effluent filter to outside to be drained away from the septic tank.

The lowermost end of the elongated tubular element is closed, preventing effluent from entering through the bottom. Instead, effluent must be filtered through the slots in the wall of the elongated tubular element of the effluent filter, then travel up the length of the interior of the tubular element is before exiting through one of the openings above the sealing gasket or ring. This particular one-pass effluent filter shares the same shortcomings as the effluent filter previously described, in that the integrity of the seal can be compromised by a deformation of the sanitary T baffle at a single location where the sealing gasket is intended to engage the sanitary T baffle. Similarly, if the dimensions of the tubular elements for either type of effluent filter, or for the inner diameter of the sealing gaskets, are inaccurate, there may be an improper fit of the sealing gasket on the tubular element, providing a chance for non-filtered effluent to bypass the slots of the effluent filter. As with the previous effluent filter, the installation of the sealing gasket on the elongated tubular element requires an additional manufacturing step. Such one-pass effluent filters and their shortcomings are described in greater detail in the Detailed Description of the Preferred Embodiments and the Drawings.

Some effluent filters in the prior art make de minimis use of substantially horizontal filtering portions located at or near the top and bottom of the effluent filter, such as shown in U.S. Pat. No. Des. 402,349. However, this unit, too, is a one-pass effluent filter that suffers from the same disadvantages of the other single pass filters described above.

An additional shortcoming of these and other single pass effluent filters found in the prior art is that the filtering slits inherently become clogged relatively quickly, after which time the filter becomes useless and needs to be cleaned. It would therefore be desirable to provide an effluent filter that has increased longevity, in that even when certain portions of the effluent filter become clogged, the effluent filter is still effective elsewhere in the filtration of particles.

It would further be desirable for an effluent filter to be made as a single piece in a single manufacturing operation, so as to reduce production time, reduce manufacturing and labor costs, reduce the number of components needed for installation, and also reduce requirements of high tolerances (such as for the interior diameters of annular gaskets that need to be installed on prior art effluent filters), and finally, to increase the rate of production of effluent filters.

Furthermore, effluent filters that have separate single sealing gaskets often do not have adequate friction from the sealing gaskets to hold the effluent filter in place within a vertical section of pipe, such as PVC or polyethylene pipe, or a T baffle, particularly if the section of pipe or the T baffle has an irregular, uneven interior surface at the desired location of interface between the gasket and the section of pipe or T baffle. Thus, another desirable feature for an effluent filter would be to provide an integral means for providing increased friction between the effluent filter and the associated section of pipe and the T baffle in which the effluent filter is located.

The manner in which the present invention overcomes these and other shortcomings of the prior art, and achieves the desirable features of an effluent filter described above, is described in the following Summary of the Invention, Drawings, and Detailed Description of the Preferred Embodiments.

SUMMARY OF THE INVENTION

The effluent filter of the present invention is a multi-level effluent filter that can advantageously be used in existing septic systems, and can be used with either a T baffle (which is also called a standard pipe T and is typically a plastic T-shaped joint), or a sanitary T baffle (which is also called a sanitary pipe T and typically is a plastic T-shaped joint having a radial sweep portion). This improved effluent filter provides the opportunity to trap particles in at least two filter zones defined by the effluent filter, namely a lower or first filter zone, and an upper or second filter zone. Particles preferably are trapped in one of these zones, instead of being charged through the outlet opening of the pipe T or sanitary T baffle. Even as certain of the many filter levels of the effluent filter become clogged, the effluent filter still operates to filter particles through yet other filter levels. The effluent filter is preferably flexible, which facilitates installation and removal, as well as improving the sealing capability with surrounding components of the septic tank system.

The effluent filter also has distinct inlet and outlet sides. A stepped arrangement for the multiple filtering levels presents many obstacles to prevent particles from reaching an outlet opening of a pipe T or sanitary T baffle in which the effluent filter is placed. The stepped arrangement provides many substantially horizontal surfaces along the length of the effluent filter, forcing particles to navigate tortuous, meandering paths in order to approach the outlet opening of the pipe T or sanitary T baffle. Over time, as these substantially horizontal surfaces collect enough particles of debris during filtration of effluent, a slime is found to accumulate on the horizontal surfaces.

Advantageously, the effluent filter has a significantly greater longevity, i.e. length of useful filtering life, than prior art effluent filters, greatly extending the time between cleanings. This increased longevity between cleanings is due to a design of the effluent filter that resists clogging of the upper or second filter zone, and has integral means for bypassing the lower filtering zone when clogged, thereby facilitating filtration of particles through the effluent filter even when some or all the layers of the lower or first filter zone have become clogged with debris or slime.

For a particle to successfully pass through the effluent filer of the present invention to reach the outlet end, and thus be discharged from the septic tank through a drainage pipe, the particle has to navigate many tortuous paths through the effluent filter. Various dead zones in the vicinity of the effluent filter also result from an intentional incline imparted to each level of the filter, requiring particles to unnaturally change direction, i.e., travel downhill, in order to reach the next higher level of the filter. Particles that do successfully pass through the effluent filter would typically have had to pass through filter slits on multiple levels of the filter, so the effluent filter is more of a multi-pass filter than those effluent filters in the prior art.

A solid angled deflector is provided at the bottom of the filter to prevent large particles and gas bubbles from entering the bottom of the effluent filter. Integral flexible wiper blades extend vertically up two sides of the effluent filter. Such vertical wiper blades serve to seal off the inlet side from the outlet side of the effluent filter along all points of contact between the effluent filter and the inner wall of a pipe in which the effluent filter is placed. Additionally, horizontal flexible wiper blades are also provided between many of the substantially horizontal filter levels. Advantageously, the various vertical and horizontal integral wiper blades cooperate to provide a superior friction fit with the surrounding pipe wall (which may be PVC or some other material pipe, such as polyethylene or HDPE), as compared to the single annular gasket commonly used with conventional effluent filters.

These flexible wiper blades also prevent subtle imperfections in the manufacture of the effluent filter, if any, from allowing particles to entirely bypass the effluent filter. In other words, the flexible wiper blades compensate for any out-of-roundness of the overall effluent filter because the wiper blades provide a plurality of flexible extensions of the effluent filter which tend to reach out to the inner wall of the sanitary T baffle or standard T baffle and provide an adequate seal. The higher flexible wiper blades therefore provide back-up to the lower flexible wiper blades, just in case any particular wiper blade fails to make an adequate seal between the effluent filter and the surrounding inner wall of the T baffle or sanitary T baffle.

In the preferred embodiment of the present invention described below, the lower or first filter zone includes the first seven filter levels of the effluent filter. However, it is recognized that fewer or additional levels could be included as part of the first filter zone, or the spacing between the levels could be varied by the manufacturer. The first level, or Level A, is a solid level defined by the solid angled deflector. The first level extends over the full outlet side of the effluent filter, and can extend partially over the inlet side of the effluent filter.

A solid vertical wall extending between the first and second filter levels divides the outlet side into two substantially equal halves between Level A and Level B. On the outlet side of the effluent filter, similar vertical walls extend between all successive odd and even filter levels to divide outlet filter pairs of the effluent filter into two substantially equal halves, i.e. between the associated odd and even levels. The second filter level, Level B, is entirely solid on the inlet side of the effluent filter, and is open on the outlet side.

A solid vertical wall extends between the second and third levels to divide the inlet side into two substantially equal halves between Level B and Level C. On the inlet side of the effluent filter, similar vertical walls extend between all successive even and odd filter levels to divide the filter pairs on the inlet side into two substantially equal halves (between the associated even and odd levels). All of the solid vertical walls help direct particles upward, toward a next higher set of filtering slits or toward a quarter circle opening in lieu of slits.

In the preferred embodiment, each of the remaining odd filter levels on the inlet side of the effluent filter in the first filter zone, namely the third, fifth and seventh layers (Levels C, E, and G, respectively), have one half comprised of a plurality of first zone filtering slits and another half that is entirely open. Each of the open halves, which are essentially open quarter circles, advantageously provide a means for particles and effluent on the inlet side to reach the outlet side or to reach the second or upper filter zone, even if the first filter zone of the effluent filter becomes clogged. The remaining even filter levels on the inlet side, namely the fourth and sixth layers (Levels D and F, respectively) are comprised of a plurality of first zone filtering slits covering the entire half-circle.

Similarly, each of the rest of the even filter levels on the outlet side in the first filter zone, i.e., Levels D and F, include one half comprised of a plurality of first zone filtering slits and another half that is entirely open. The open halves, again in the form of essentially open quarter circles, advantageously provide a means for particles and effluent to reach the second filter zone, even if the first filter zone becomes clogged. The remaining odd filter levels on the outlet side of the effluent filter, Levels C, E and G, are comprised of a plurality of first zone filtering slits covering each respective entire half-circle.

While it is recognized that there can be great variation in the dimensions of the filtering slits, in one preferred embodiment of the present invention each of the lower or first zone filtering slits has a width slightly larger than that of the slits in the second or upper filter zone. In one embodiment described below, by way of example only, the second zone's filtering slits have a width of about $1/16$th inch, while the first zone's filtering slits have a width of slightly larger than $1/16$th inch. The $1/16$th inch width of the second zone filtering slits is (currently) preferable because it (at least currently) is in compliance with the relevant known county, state, and national certification agencies' health and environmental codes, but that can change. It is recognized that the filtering slits may instead all be the same dimension, or the filtering slits in the first zone may instead be smaller than the filtering slits in the second zone. There are tradeoffs to consider in varying the size of the filtering slits, such as the size of the particles that can be filtered and the length of time before the filtering slits become clogged.

On the inlet side of the effluent filter, solid semi-cylindrical exterior wall members extend between the successive even and odd filter levels of the first filter zone, i.e., between the second and third (Levels B and C), fourth and fifth (Levels D and E), and sixth and seventh (Levels F and G) filter levels, so that each pair of connected filter levels forms a wafer. Each of the semi-cylindrical exterior wall members is provided with an exterior integral horizontal outwardly-projecting semi-annular wiper blade to cooperate with the vertical wiper blades extending outwardly along the sides of the effluent filter. These various horizontal and vertical flexible wiper blades cooperate to provide an increased friction fit between the effluent filter and the inner wall of the surrounding pipe in which the effluent filter is placed and operates.

Similarly, such semi-cylindrical wall members extend between odd and even filter levels on the outlet side of the effluent filter in the first filter zone, i.e. between the first and second (Levels A and B), third and fourth (Levels C and D), fifth and sixth (Levels E and F), and seventh and eighth (Levels G and H) levels. These outlet side semi-cylindrical side walls are provided with the integral, outwardly-extending horizontal wiper blades that cooperate with the previously-described integral horizontal and vertical wiper blades to increase the friction fit between the effluent filter and the inner wall of the surrounding pipe. All the integral wiper blades in the first filter zone also prevent particles from bypassing the effluent filter by blocking particles and effluent from passing between the inner wall of the pipe and the effluent filter. These wiper blades and the resultant friction fit they create also help maintain the effluent filter in its proper operating location and orientation, i.e., they keep the effluent filter from "floating up" within the pipe due to varying tank fluid pressures and varying effluent fluid levels.

A further benefit of such integral wiper blades is that the integrity of the seal between the present effluent filter and the surrounding pipe T, sanitary T baffle, or pipe is not dependent on a single region, i.e. such as where a single annular sealing gasket of the prior art is provided on a conventional effluent filter in an effort to sealingly engage the surrounding component. Even if one or more local regions of the associated pipe components are damaged or out of round for any reason, the remaining flexible integral wiper blades ensure that integrity of the overall seal (between the effluent filter and the given surrounding components) is not compromised.

Sedimentation is found to occur predominantly on the upper filter levels of each wafer, mainly on the inlet side of the effluent filter. Although a given wafer may become clogged by the sediment, biological action or variations in flow rates may dislodge the sediment, and unclog the wafer at a later point in time.

The upper or second filter zone starts at the eighth filter level, Level H, and terminates at the eighteenth level, Level R, in the preferred embodiment discussed further below. However, as in the first filter zone, it is recognized that fewer or additional filter levels could be included as part of the second filter zone. On the outlet side of the effluent filter, each of the eighth through eighteenth levels, Levels H through R, have a plurality of second zone filtering slits across the entire level.

On the inlet side of the upper or second filter zone, the preferred profile is to have alternating successive even and odd pairs of filter levels staggered in a step-wise fashion. Each step comprises a pair of successive filter levels with each including a plurality of second zone filtering slits covering half the inlet side level, i.e., each step forms a one-quarter circle. The remaining half of the inlet side filter level, i.e. the remaining quarter circle, is an open (or blank) quarter circle that allows effluent fluid to flow freely to a next-higher level of the effluent filter, or through a filtering wall to the outlet side.

Between each successive odd and even level on the inlet side that does have the second zone filtering slits, solid quarter-cylindrical external wall members are provided. Preferably, each of these quarter-cylindrical wall members is also equipped with an external integral horizontal flexible wiper blade, which cooperates with the integral horizontal flexible external wiper blades (on both the inlet and outlet sides of the lower filter zone) and the vertical integral wiper blades (along the sides of the effluent filter) to contribute to the improved friction fit between the effluent filter and the inner walls of the associated pipe component in which the effluent filter is placed and operates.

The outlet side of the second filter zone is similar to the outlet side of the first filter zone, except that there are no open quarter-circles, each filter level is made up of a plurality of narrower second zone filtering slits (as opposed to the somewhat wider first zone filtering slits), and there are no integral horizontal wiper blades on the outer surfaces of the semi-cylindrical wall members extending between successive odd and even levels. No integral wiper blades are found necessary here for at least two reasons. First, when the effluent filter is used with a sanitary T baffle, the outlet side of the second filter zone is in close proximity to the sweep of the sanitary T baffle, thus the wiper blades would not be in contact with the interior of the sanitary T baffle. Advantageously, the sweep of the sanitary T baffle is adequately sealed by the vertical integral wipers along the sides of the effluent filter, and the horizontal wiper blades along the semi-cylindrical wall members on the outlet side of the first filter zone. Thus, these sets of wiper blades adequately prevent unfiltered effluent and particle debris from bypassing the effluent filter and undesirably entering the outlet opening of the sanitary T baffle.

A second reason the horizontal wiper blades are not provided on the outlet side in the upper filter zone is the need for filtered effluent to bypass a given pair of horizontal filter levels of any region of the effluent filter which eventually becomes clogged (e.g. slimed) filter with slime or debris. The absence of a horizontal wiper blade between the inner wall of the pipe, T baffle, or sanitary T, and the semi-cylindrical wall member connecting the two horizontal filter levels, allows the filtered effluent to bypass the clogged levels of the effluent filter, thereby increasing the longevity between cleanings of the effluent filter.

In the lower or first filter zone there are no vertical wall members separating the inlet side from the outlet side. Thus, effluent is permitted to flow from the inlet side to the outlet side between any pair of successive filter levels. In the upper or second filter zone, at each open blank section adjacent the stepped pairs of successive even and odd filter levels, there is a vertical wall member having a plurality of narrower second zone filtering slits separating the inlet side from the outlet side. Between the top filter level on the outlet side of the effluent filter and the covering panel, a vertical wall having a plurality of second filter zone slits extends across the substantially the entire width or diameter of the effluent filter.

The covering panel at the top of the effluent filter is preferably provided with a plurality of venting slits on the inlet side of the filter to allow for gases to vent out of the effluent filter. The venting slits of the covering panel are also preferably small enough to prevent solid debris, and some grease, fats, oils and floatables, from entering the effluent filter through the covering panel. This is necessary because, in the event of clogging of the filter, the scum layer in the septic tank rises, and eventually spills over the top of the T baffle. Because the slits are on the inlet side of the filter, any such debris, grease, fats, oils and floatables that do pass through the venting slits in the covering panel still have to pass through one of the filters in the upper or second filter zone to reach the outlet of the T baffle, and exit the septic tank.

In order for an effluent filter manufacturer to easily modify the profile of each of the filter levels of the present effluent filter, the injection mold used for forming the effluent filter can be provided with easily replaceable individual mold inserts for each filter level, or alternatively, for groups of filter levels, in a manner conventionally used in the injection molding industry. Thus, if it would be more desirable to provide a fewer (or greater) number of open filter level-halves, or instead, to provide successively smaller (or greater) filter slit widths at successive filter levels, the individual mold inserts could be easily changed to accommodate such desired profile modifications. Further aspects of the effluent filter of the present invention are set forth in the drawings and the Detailed Description of the Preferred Embodiment.

DESCRIPTION OF THE DRAWINGS

FIG. 6 is a front side elevation view showing the inlet side of the present effluent filter of FIG. 4, with the surrounding sanitary T baffle and pipe in cross-section;

FIG. 7 is a rear elevation view showing the outlet side of the present effluent filter of FIG. 4, again with the surrounding sanitary T baffle and pipe in cross-section;

FIG. 8 is a perspective view taken from the inlet side of the present effluent filter;

FIG. 9 is another perspective view similar to FIG. 8, but taken from the outlet side;

FIG. 10 is a cross-sectional view showing typical filter levels of the lower or first filter zone of the present effluent filter, taken along lines 10—10 of FIG. 8;

FIG. 11 is a cross-sectional view showing typical filter levels of the second filter zone of the effluent filter, taken along lines 11—11 of FIG. 8;

FIG. 12 is a right side view, cut away, of several filter levels of the second filter zone;

FIG. 13 is a right side view, cut away, of several filter levels of the second filter zone of an alternate embodiment of the effluent filter of the present invention;

DETAILED DESCRIPTION OF THE PREFERRED EMBODIMENTS

Figure 1:
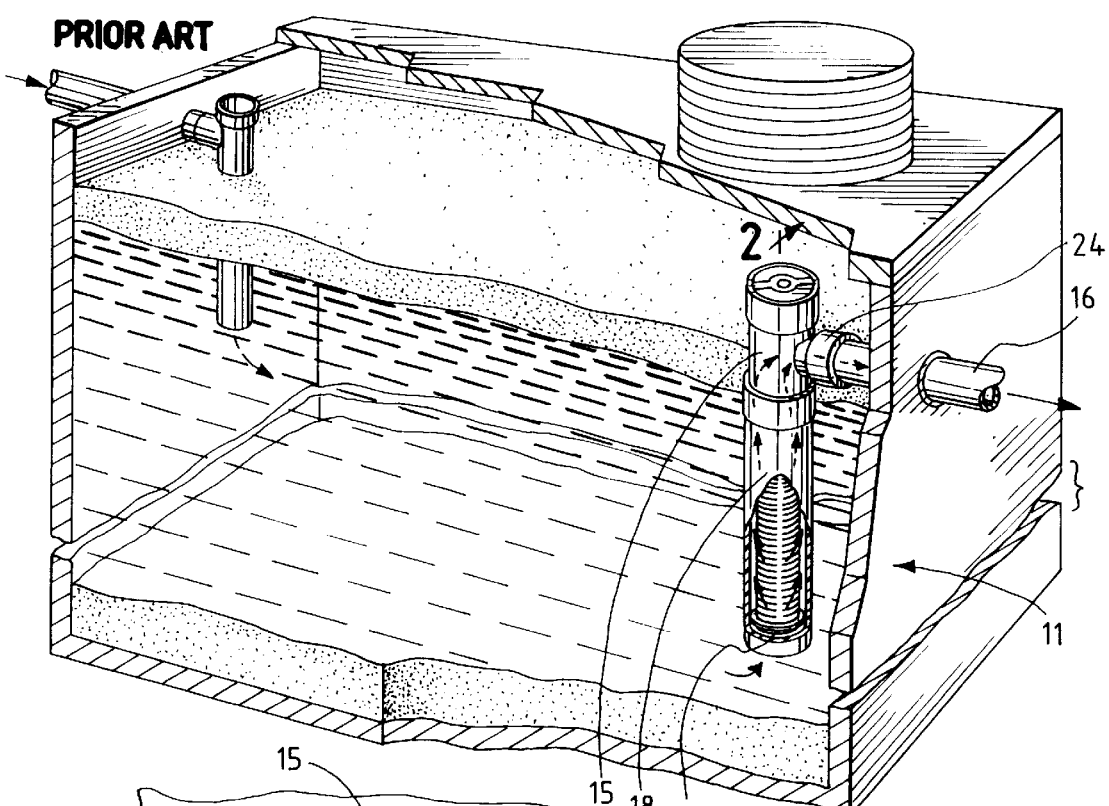
FIG. 1 is a segmented perspective environmental view, partially broken away, of a prior art so-called "one-pass" effluent filter, in combination with a T baffle of a septic tank.
Figure 2:
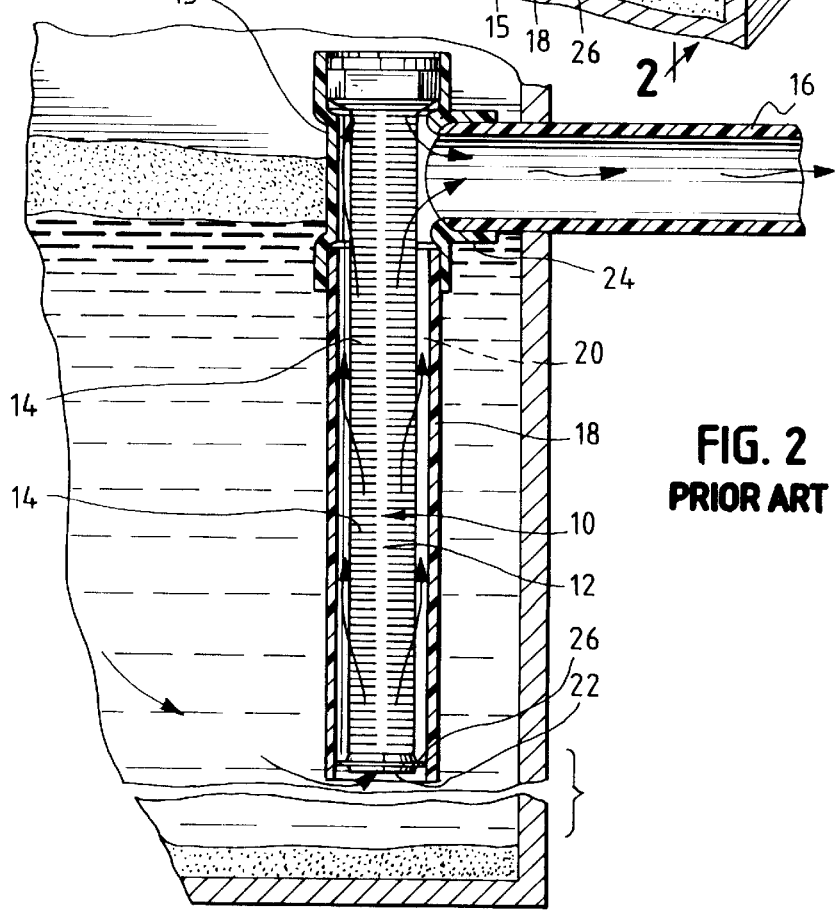
FIG. 2 is a cross-sectional side view of the prior art one-pass effluent filter of FIG. 1, taken along lines 2—2 of FIG. 1.

In order to fully understand the benefits and operation of the multi-pass effluent filter of the present invention, it is first useful to consider in greater detail various conventional one-pass effluent filters found in the prior art. One such effluent filter 10 used in a septic tank system 11 is shown in FIGS. 1 and 2. The prior art effluent filter 10 is in the form of an elongated cylinder 12 having a plurality of horizontal slits 14. In compliance with many presently known county, state, and national certification agencies' health and environmental codes, the width of the slits 14 is approximately 1/16th inch. The effluent filter 10 is located in a so-called pipe "T" 15, which is attached to a generally horizontal outlet drainage pipe 16 and a generally downwardly-extending vertical length of PVC (or similar material) pipe 18.

The elongated cylinder 12 of the prior art effluent filter 10 defines an interior tube 20 open at the lower end 22 of the elongated cylinder 12. Liquid waste effluent from the septic tank's clear zone, which typically carries particles therein which should be filtered, flows into the interior tube 20 at the lower end 22 of the elongated cylinder 12 and travels up through the interior tube 20. In order for the effluent to be discharged through the outlet 24 of the pipe T 15 to the outlet drainage pipe 16, the effluent must pass from the interior tube 20 to outside the effluent filter 10, as indicated by the directional arrows in FIGS. 1 and 2. Essentially, this prior art effluent filter 10 depends upon filtering effluent into a sealed outer zone between the exterior surface of the elongated cylinder 12 and the inner side walls of the pipe 18 and pipe T 15. Trapping of any given particles between the slits 14 must necessarily occur during a single attempt of the such given particles to pass through a given one of the slits 14. This is a typical type of so-called "one pass" effluent filter. All such "one-pass" filters suffer from the shortcoming that if any particles succeed in making a single pass through the slits 14, then those particles will undesirably pass out of the septic tank through the drainage pipe 16, as there is no further filtering taking place.

The prior art effluent filter 10 has a single annular rubber sealing gasket 26 provided at the bottom thereof in order to seal the lower end 22 of the elongated cylinder 12 to the interior of the length of pipe 18. The pipe 18 extends lower than the lower end 22 of the prior art effluent filter 10. This single gasket 26 is a separate piece from the elongated cylinder 12, and is received in an annular groove on the exterior of the elongated cylinder 12 just above the lower end 22. One serious drawback of such prior art effluent filters is that because there is only a single sealing gasket 26 provided at the bottom of the effluent filter 10, if the length of pipe 18 happens to be cut too short, the sealing gasket 26 may miss contacting the inner wall of the pipe 18, thus allowing effluent to entirely circumvent the effluent filter. Installation of the annular sealing gasket 26 requires a secondary assembly operation involving stretching the sealing gasket 26 over the lower end 22 to place the sealing gasket 26 into the annular groove. It also requires two separate pieces to be made and assembled together prior to shipment.

Because there is only one sealing gasket 26, this prior art effluent filter 10 necessarily depends on the presence and the integrity of the interior sidewall of the pipe 18 at the exact location where the sealing gasket 26 interfaces with the pipe 18. If the pipe 18 is slightly out of round in that location, or is too short, as discussed above, the integrity of the seal could be compromised, undesirably circumventing the effluent filter 10 altogether by allowing particles to pass between the effluent filter 10 and the pipe 18, and exit the outlet drainage pipe 16 attached to the pipe T 15, without first passing through the slits 14 of the effluent filter 10.

Another drawback of such an annular sealing gasket 26 is that if the interior dimension (not shown) in the gasket 26 is too large for the corresponding groove of the effluent filter 10, the fit will be too loose, also undesirably allowing particles to bypass the effluent filter 10. When used in septic tanks having smaller than average-sized Schedule-40 (or other size) pipes, a gasket 26 that is too large for the associated groove of the effluent filter 10 can have a tendency to become dislodged from the effluent filter 10.

In an alternate style prior art effluent filter 30, shown in FIG. 3, the elongated cylinder 32 extends below the length of pipe 34 and into the clear zone of the septic tank. Instead of traveling through an opening at the lower end and up through the center of this alternate prior art effluent filter 30 (as occurred in the previous case), yet-to-be filtered effluent can only enter the interior of the elongated cylinder 32 by passing through the horizontal slits 36. The lower end 38 of the elongated cylinder 32 is capped to prevent any unfiltered effluent from entering the interior of the elongated cylinder 32.

Figure 3:
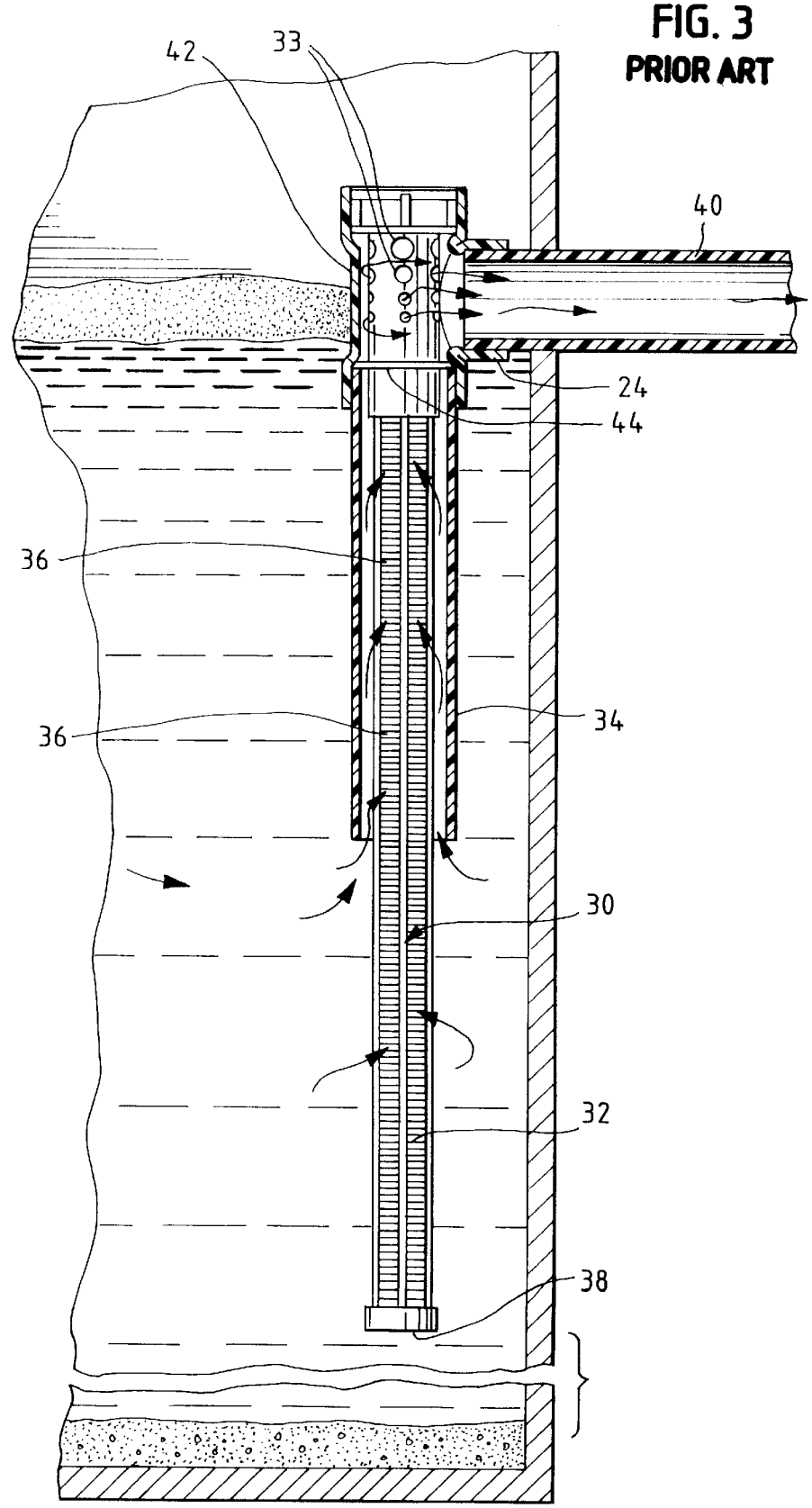
FIG. 3 is a cross-sectional side view of a second prior art "one-pass" effluent filter shown in combination with a T baffle of a septic tank.

A plurality of openings 33 at an upper end of the elongated cylinder 32 allow filtered effluent to be discharged to the outlet drainage pipe 40 attached to a pipe T 42, as indicated by the directional arrows in FIG. 3. In this alternate prior art effluent filter 30, a single annular sealing gasket 44 is provided in an annular groove located in an upper portion of the elongated cylinder 32, below the openings 33 but above the filtering slits 36. The sealing gasket 44 is used in combination with the cap at the lower end 38 of the effluent filter 30 to seal off an inner zone defined by the inner wall of the elongated cylinder 32, into which effluent is filtered. When used in conjunction with a sanitary T baffle, which has a sweep (i.e., an arcuate portion of the sanitary T baffle that is designed to prevent objects entering the top of the sanitary T baffle from blocking the outlet opening), the sealing gasket 44 must be positioned below the sweep.

Such an alternate prior art effluent filter 30 suffers from many of the same shortcomings of the previous prior art filter 10. First, extra parts and extra assembly steps are required to install the sealing gasket 44 on the elongated cylinder 32. Second, the effluent filter 30 requires a smooth, round surface at the specific location of the intersection of the sealing gasket 44 and the pipe 34, or for the interior of the T 42 in which the upper portion of the effluent filter 30 is located if the gasket 44 is higher than the top of the pipe 34. Third, although particles are filtered from the outside to the inside of the alternate prior effluent filter 30 of FIG. 3, as opposed to being filtered from the inside to the outside of the previous prior art effluent filter 10 of FIGS. 1 and 2, this alternate effluent filter 30 is again only a one-pass filter.

As shown in FIGS. 4–9, the improved effluent filter 50 of the present invention has an inlet side 52 and an outlet side 54. Preferably, the effluent filter 50 has a lower or first filter zone 56 and an upper or second filter zone 58. The first filter zone 56 of the effluent filter 50 shown in the drawings includes the first seven substantially horizontal filter levels, namely Levels A, B, C, D, E, F, and G. The second filter zone 58 includes the remaining eleven substantially horizontal filter levels, namely Levels H, I, J, K, L, M, N, O, P, Q and R. However, it is recognized that both the first filter zone 56 and the second filter zone 58 can include fewer or additional filter levels within the scope of the present invention.

Figure 4:
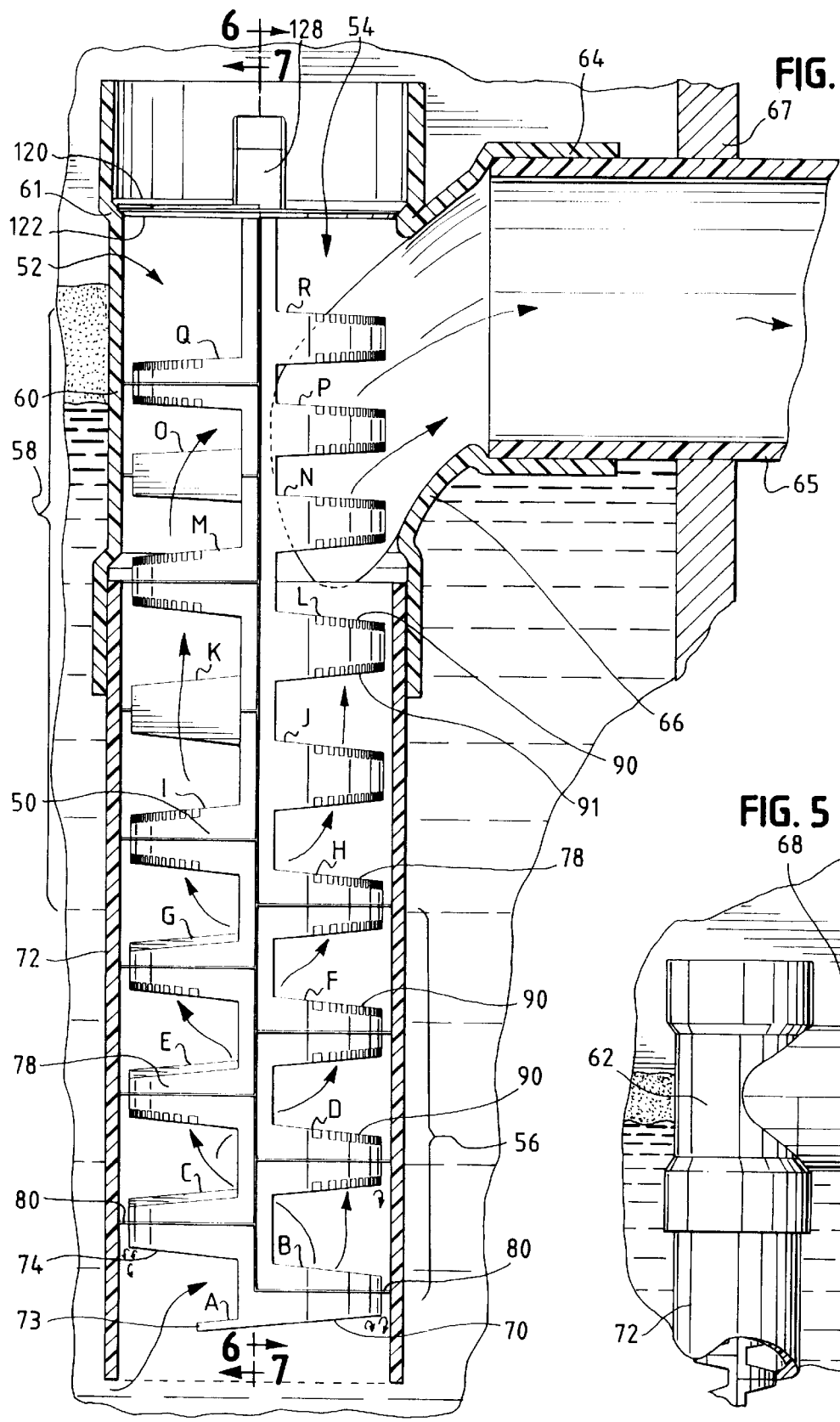
FIG. 4 is a right side view of the improved effluent filter of the present invention, shown in combination with a sanitary T baffle and pipe of a septic tank in cross-section.
Figure 5:
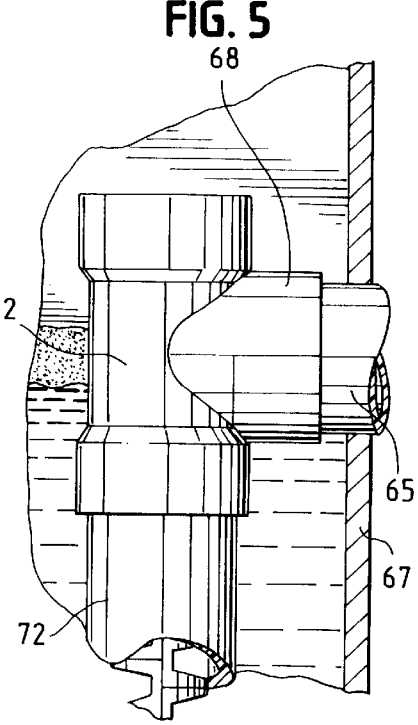
FIG. 5 is a side view of the effluent filter of the present invention, broken away, shown in combination with a T baffle.

The effluent filter 50 can be used in septic tanks having a pre-existing sanitary T baffle, such as the sanitary T baffle 60 shown in FIG. 4, or instead, with a pre-existing T baffle 62 as shown in FIG. 5. As is known, the typical sanitary T baffle 60 has at least one reduced diameter shoulder area 61, an outlet opening 64, and a so-called sweep portion 66. The sweep portion 66 extends from the outlet opening 64 to a point no farther than the center of the sanitary T baffle 60, i.e. the sweep portion 66 does not extend into the region of the sanitary T baffle 60 shared by the inlet side 52 of the effluent filter 50. An outlet pipe 65 is attached to the outlet opening 64 to carry preferably filtered effluent through a septic tank wall 67 and away from the septic tank.

Importantly, the effluent filter 50 tends to be a multi-pass filter, meaning that effluent and any debris or particles that may be floating in the effluent will most likely pass through more than one filtering screen, i.e., a set of filtering slits, before reaching the outlet opening 64 of the sanitary T baffle 60 (or, alternatively, the outlet opening 68 of the T baffle).

The first filter level of the effluent filter 50, Level A, is a solid angled deflector plate 70. The angled deflector plate 70 advantageously decreases the likelihood that any upwardly-rising gas bubbles and larger particles of debris will enter the effluent filter 50 after such debris and/or gas bubbles have entered a length of pre-existing pipe 72 in which the effluent filter 50 is located. The pipe 72 may be conventional pipe, or some other material, such as polyethylene. Also, while the pipe 72 may be conventional 4" diameter pipe, the effluent filter 50 may alternately be sized to fit, for example, with 3", 6", 8", 12", or other diameter pipe. The angled deflector 70 extends substantially over the entire outlet side 54 of the lowermost filter level, Level A, and partially over the inlet side 52, forming a lowermost ledge 73 of the effluent filter 50. is Due to the incline of the angled deflector 70, many particles can get trapped in a so-called "dead zone" underneath the angled deflector 70 on the outlet side of the effluent filter 50, as indicated by the small curly arrows shown beneath the angled deflector 70 in FIG. 4. This phenomenon is due to the unlikely tendency for such particles, that tend to float upward in the effluent, to reverse direction and travel back toward the inlet side 52, where they would otherwise find an opening.

The second filter level, Level B, is open on the outlet side of the effluent filter 50, and a second solid angled deflector 74 is provided on the inlet side. The incline of the second angled deflector 74 advantageously similarly creates another dead-zone underneath the second angled deflector 74 on the inlet side 52, which again acts to trap some particles and make it more difficult for the particles to advance upward in the effluent filter toward the outlet opening of the sanitary T baffle 64. A vertical wall 76 between Levels A and B separates the outlet side 54 of the effluent filter 50 into two equal halves. Similar vertical walls 76 are provided between each successive odd and even filter level on the outlet side 54, and between each successive even and odd filter level on the inlet side 52 (in both the first filter zone 56 and the second filter zone 58) to provide overall structural rigidity to the effluent filter 50.

Semi-cylindrical wall members 78 connect successive odd and even filter levels on the outlet side 54 and connect successive even and odd filter levels on the inlet side 52 of the first filter zone. Each pair of connected filter levels defines a wafer 79 (see FIG. 12) having a substantially horizontal top filter level 79a and a substantially horizontal bottom filter level 79b. Each of the semi-cylindrical wall members 78 are provided with integral, horizontally-aligned, flexible wiper blades 80 extending radially outwardly from the semi-cylindrical wall members 78. For example, such a wiper blade 80 is integral with the semi-cylindrical wall member 78 as extending between filter Levels A and B on the outlet side 54.

The respective horizontal wiper blades 80 cooperate with flexible vertical integral wiper blades 82, 84, which extend outwardly along each of two elongated side legs 86, 88 of the effluent filter 50. The two elongated side legs 86, 88 define a boundary that separates the inlet side 52 from the outlet side 54, although effluent is still able to flow between the inlet side 52 and the outlet side 54. All the integral wiper blades 80, 82, and 84 are flexible and provide an increased friction-fit with the interior of the T baffle 62 or sanitary T baffle 60, and with the inner wall of the pipe 72. Most preferably, the entire effluent filter 50 is flexible, which further facilitates installation and removal of the effluent filter 50 from the surrounding components, such as the sanitary T baffle 60 and the section of pipe 72, as well as enhances the seal between the wiper blades 80, 82, 84 and the inner wall of the pipe 72. This is because the flexibility of the effluent filter 50 as a whole, as well as the flexibility of the individual wiper blades 80, 82, 84 allows the effluent filter 50 to compensate for any minor imperfections in the contour of the inner wall of the pipe 72.

Advantageously, the integral wiper blades 80, 82, 84 overcome various shortcomings of prior art effluent filters. First, since the flexible wiper blades are formed integrally with the effluent filter 50, no additional manufacturing and installation processes are required to install separate sealing gaskets on the effluent filter. This greatly decreases production and installation time. Second, the problem of tolerances, as present with different sizes (e.g. schedules) and manufacturers of pipes and T baffles, and also of out-of-round pipe components and sealing gaskets, is significantly reduced. When conventional annular sealing gaskets do not fit on the effluent filter correctly, there is a significant chance that effluent will leak through a gap between the filter and the gasket, thereby entirely bypassing the effluent filter. This problem is simply avoided by the present effluent filter 50 with the presence of the multiple cooperating integral wiper blades 80, 82, 84. Third, so long as at least one wiper blade reaches the inner wall of the pipe 72, particles will not be able to circumvent the effluent filter. Thus, the problem of pipes being too short is significantly reduced.

Fourth, the integral wiper blades 80, 82, 84 also significantly reduce the concern that the inner wall of the sanitary T baffle 60, the T baffle 62, or the interior of the pipe 72 is out-of-round at the very area of interface, i.e. engagement, with the effluent filter 50. For example, if one local area of the pipe 72 is out-of-round where it would otherwise contact one of the integral wiper blades, the other surrounding wiper blades provide a back-up seal to ensure no unfiltered effluent is able to bypass the effluent filter 50 and undesirably reach an outlet pipe connected to the outlet opening 64 of the sanitary T baffle 60.

A fifth benefit, especially of the horizontal integral wiper blades 80, is that they cooperate with the inclined angle of each of the levels in the first filter zone to provide the dead-zone phenomenon discussed above with respect to the angled deflector 70 (although to a lesser extent, because some particles would still pass through the filtering slits at the associated filter levels). Because many particles have a specific gravity less than 1, they tend to get trapped in a "dead-zone" between the outer edge of the vertical semi-cylindrical wall members 78 and the inner wall of the pipe 72, and underneath the horizontal integral wiper blades 80. Advantageously, it is more difficult for such particles to reverse direction and travel downward in the effluent to reach a higher level within the effluent filter 50.

Each filter Level C, E and G on the outlet side 54 of the effluent filter 50 comprises a plurality of first zone filtering slits 90 across the entire outlet side of that filter level. In the specific embodiment shown in the drawings, the first zone filtering slits 90 each have a width of slightly larger than ¹⁄₁₆th inch, such as approximately 0.085 inch. However, it is recognized that the width of the first zone filtering slits 90 may instead be ¹⁄₁₆ inch. They can range between 0.03125 and 0.123 inch in open spacing between filter bars 91, which define the filtering slits 90. However, it is recognized that the width of the first zone filtering slits can be wider or narrower, and can vary in width from level-to-level, can even be of varying widths in a single level, if so desired. For example, it may be desired to provide slits of successively narrower widths in successively higher filtering levels, or vice-versa, i.e., providing slits of successively wider widths in successively higher filtering levels. Some of the trade-offs in selecting the widths for the filtering slits include the ability to filter finer particles against the filter clogging up more quickly.

Each of filter Levels D and F on the inlet side 52 similarly comprises a plurality of first zone filtering slits 90 across the entire inlet side of the level. Filter Levels D and F on the outlet side 54 have first zone filtering slits 90 covering only approximately one half of the outlet side of the level, thereby leaving the remaining one half of the outlet side of such filter level open. This, in effect, creates a quarter circle opening 92.

Similarly, filter Levels C, E and G on the inlet side 52 have first zone filtering slits 90 covering one half of the inlet side of each filter level, leaving the remaining one half of the inlet side of the filter level open, again creating a quarter circle opening 94. Advantageously, even as the first zone filtering slits 90 become clogged, effluent can still reach the upper or second filter zone 58 by passing through the various quarter circles openings 92, 94 on the inlet side 52 and outlet side 54 of the effluent filter 50.

In the first filter zone 56, there are no vertical walls separating the inlet side 52 from the outlet side 54. Thus, effluent and particles can flow back and forth between the inlet side 52 and the outlet side 54 between filter levels without obstruction.

Turning now to the second filter zone 58, each of the filter levels on the outlet side 54, namely Levels H, I, J, K, L, M, N, O, P, Q and R, include a plurality of second zone filtering slits 96 over substantially the entire surface of the outlet side of a given filter level. Notably, although the successive odd and even filter levels in the second filter zone 58 are connected by semi-cylindrical wall members 78, the semi-cylindrical wall members 78 in the second filter zone 58 do not include integral wiper blades thereon. No wiper blades are provided on the outlet side of the second filter zone 58 for two reasons. First, such wiper blades would not generally contact the interior wall of a length of pipe 72 or the interior of a sanitary T baffle 60 because of the outlet opening 64 and the sweep 66 of the sanitary T baffle 60.

Second, in order to increase the longevity of the present effluent filter between required cleanings, it is necessary to provide a way for filtered effluent to bypass certain regions of the effluent filter as, over time, such regions become clogged with slime or debris. For example, it is found that in each wafer 79 of two connected filter levels, namely a top filter level 79a and a bottom filter level 79b, the top filter level 79a collects debris and becomes clogged with slime at a faster rate than the bottom filter level 79b. Yet, the effluent filter 50 can still continue to operate to filter particles out of effluent even after the top filter level 79a becomes clogged, but before the bottom filter level 79b becomes clogged, because effluent filtered upward through the bottom filter level 79b will flow in the middle of the wafer 79, i.e., between the top and bottom levels of the wafer, and back to the inlet side, as explained in greater detail below.

Once the bottom filter level 79b also becomes clogged with debris, filtered effluent can no longer enter the clogged wafer 79. However, instead of causing a back-up that can shut down the entire septic tank system, as would typically occur in conventional one-pass filters, the filtered effluent can advantageously bypass the clogged wafer 79. Due to the lack of a horizontal wiper blade, there is a gap between the cylindrical side wall 78 and the interior of the pipe 72 or sanitary T baffle 60 for such filtered effluent to continue to flow upward. The design of the multi-pass effluent filter 50 assures that effluent will be filtered at another filtered level before reaching the outlet side of the upper or second filter zone 58. Importantly, it is recognized that a given wafer 79, although clogged at a certain point in time, may, due to biological action, or due to fluctuations in flow rates of effluent in the septic tank, become unclogged at a later point in time. Biological action under which some of the particles undergo decomposition, coupled with change in effluent flow rates, can break loose the particles clogging the given wafer.

Figure 14:
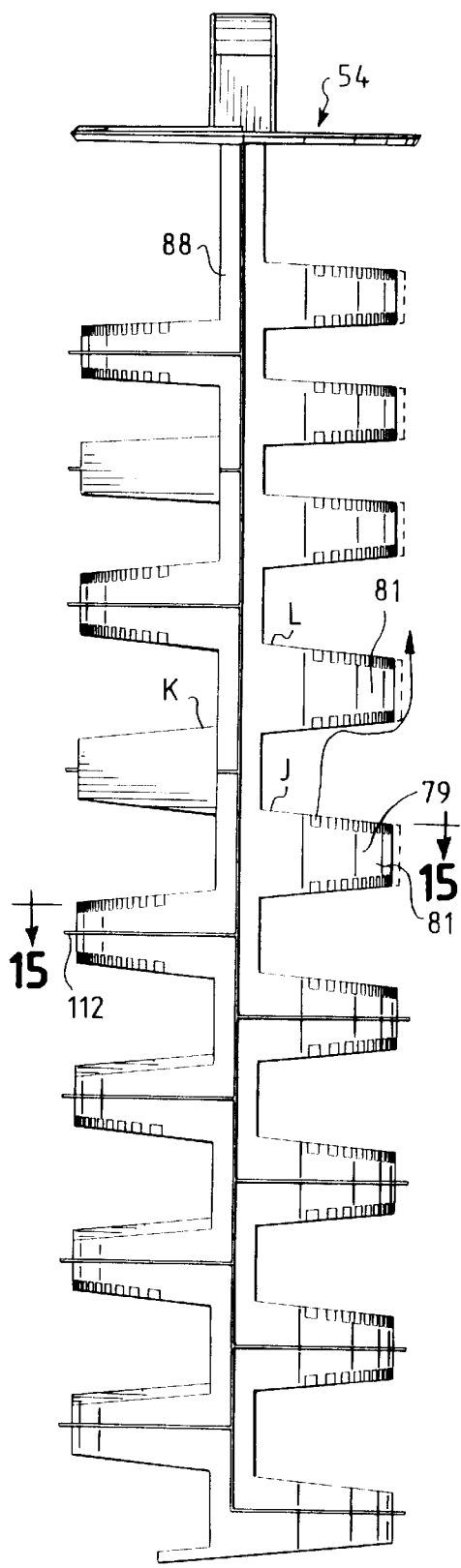
FIG. 14 is a right side view of a second alternate embodiment of the effluent filter of the present invention.
Figure 15:
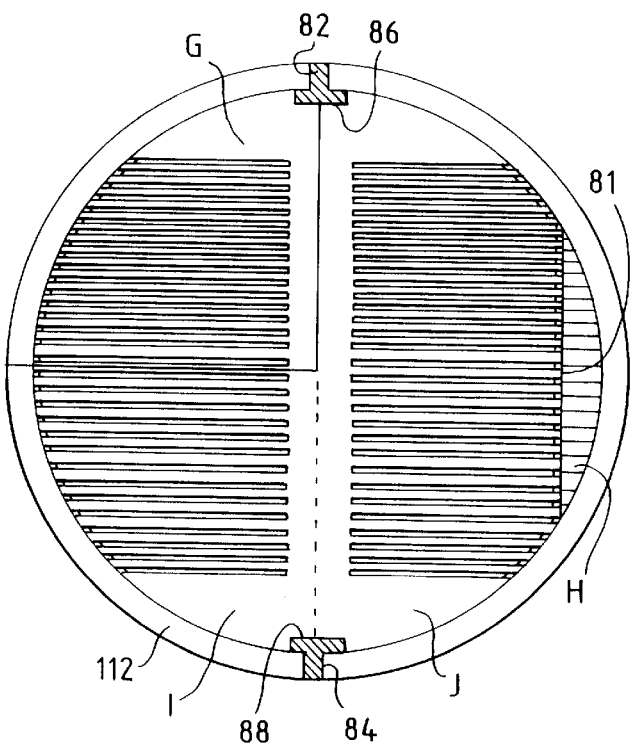
FIG. 15 is a cross-sectional view showing filter levels on the outlet side of the second filter zone having a shortened distal end, taken along lines 15—15 of FIG. 14.

This bypass feature is even more prevalent in an alternate embodiment of the effluent filter shown in FIGS. 14 and 15 in which, on the outlet side 54 of the second filter zone 58, each wafer 79 has a distal end 81 that is squared off to provide a wider vertical column for filtered effluent to bypass clogged pairs of filter levels. The portion of each of the wafers 79 that has been removed to provide the distal end 81 is indicated in broken lines (in FIG. 14). For example, the partial flow path of filtered effluent fluid in the event of blockage or clogging of both filter Levels K and L on the outlet side 54 of the effluent filter is indicated by the directional arrow in FIG. 14. As indicated by the arrow, the effluent fluid (which has already been filtered at Level J) is able to bypass the higher clogged levels because of the shortened distal end 81 of the wafer 79, and thereby avoid shut-down of an entire septic tank system.

In addition to the filtering slits, an appreciable amount of filtering is believed to occur due to sedimentation on the various wafers 79 of the effluent filter. Most of the sedimentation is found to occur on the top filter levels 79a of the wafers 79 on the inlet side 52 of the effluent filter 50.

Turning back to FIGS. 4–12, the second zone filtering slits 96 preferably have a width of about $\frac{1}{16}$th inch so as to comply (at least currently) with the known pertinent local health and environmental codes, as well as national certification agencies' codes. It is recognized that the second zone filtering slits 96 can vary in width as desired by the manufacturer, preferably within a range of $\frac{1}{32}$ inch to $\frac{1}{16}$ inch. For example, it may be desirable to provide successively narrower widths for successively higher filter levels, or vice-versa, or to have all first zone filtering slits 90 and second zone filtering slits 96 be the same width, e.g., $\frac{1}{16}$ inch.

On the inlet side 52 of the second zone 58 of the effluent filter 50, filter Levels H and I, L and M, and P and Q are provided with a plurality of second zone filtering slits 96 over a first half of the inlet side, with each of the respective pairs of filter levels being connected by a quarter-cylindrical wall member 98, thereby forming quarter-cylindrical filter steps 100. The second half of each of these six respective filter levels on the inlet side 52 is a blank open space (see FIG. 8). Filter J and K, and N and O are similarly provided with a plurality of second zone filtering slits 96 over the second half of the inlet side, with each of the respective pairs of filter levels being connected by a quarter-cylindrical wall member 102, also forming quarter-cylindrical filter steps 104. The first half of each of the filter levels J, K, N and O on the inlet side 52 is another blank open space.

Vertical filter walls 106, 108 are provided adjacent the quarter-cylindrical filter steps 100, 104, respectively, again for maintaining separation of the inlet side 52 from the outlet side 54. Each of the vertical filter walls 106, 108 includes a plurality of vertical second zone filter slits 110 formed across substantially their entire surface. Each of the quarter-cylindrical wall members 98, 102 is provided with a horizontal, integral, outwardly-extending wiper blade 112. Furthermore, the side walls 86, 88 of the effluent filter 50 may be provided with integral horizontal wiper blade studs 114 on the inlet side 52 in the same plane as each of the horizontal integral wiper blades 112 and opposite each of the quarter-cylindrical steps 100, 104.

The successive pairs of filter levels in the second filter zone 58 are preferably closer to one another than the pairs of levels in the first filter zone 56. The many filter levels of the present effluent filter 50 advantageously extend the filter's longevity between cleanings, because it takes longer for all of the filtering slits 90, 96 in the first filter zone 56 and in the upper filter zone 58 to clog.

Each of the filter Levels A through R of the effluent filter 50 are preferably inclined such that the underside of the lowermost level of each pair of connected levels is angled upward away from the central axis of the effluent filter 50. In this manner, a series of dead zones are desirably created under several of the filter levels, so that particles that do not fit through the respective first zone filtering slits 90 or through the respective second zone filter slits 96 would have to flow unnaturally downhill to reach a filter opening in order to then travel farther up the effluent filter and toward the outlet pipe 65 connected to the outlet opening 64 of the sanitary T baffle 60. The preferred angle of incline for each of the filter Levels A through G in the first filter zone 56 is ±12°; and for filter Levels H through R in the second filter zone 58, the preferred angle of incline is ±6°, with the direction of incline alternating at each successive filter level. It is recognized, however, that the angle of incline of the filter levels can vary anywhere from ±1° to ±45°. Due to molding techniques currently used, an angle of incline of at least ±1° is necessary. There is a trade-off in increasing the angle of incline because the greater the angle, the less horizontal filtering space is available.

As best seen in FIGS. 8, 9 and 12, each of the substantially horizontal filtering slits terminate at the semi-cylindrical wall member 78 connecting each wafer 79 of top and bottom filter levels 79a, 79b in a short u-shaped opening 115. In an alternate embodiment shown in FIG. 13, each of the filtering slits instead terminate at the semi-cylindrical wall member 78 in an elongated U-shaped opening 117. In this manner, the substantially horizontal filtering slits also include an integral vertical filtering component to provide increased filtering capability to the effluent filter.

As seen in FIGS. 6–9, vertical wall member 116, including a plurality of vertical filter slits 118, is provided between the top filter level, Level R, and the integral covering panel 120 of the effluent filter. The integral covering panel 120 preferably has a beveled outer edge 122 to facilitate sealed contact between the effluent filter 50 and the reduced diameter shoulder area 61 of the sanitary pipe T 60 (or the T baffle 62). The vertical filter slits 118 preferably have a width of about 1/16th inch, i.e. the same width as the second zone filtering slits 96. Vertical filter slits 118 allow effluent to flow from the inlet side 52 to the outlet side 54. Also, the vertical filter slits 118 provide a primary filter means for effluent that may enter through venting slits 124, which are provided between a plurality of teeth 126 in the integral covering panel 120 on the inlet side 52 of the integral covering panel 120.

This feature is important because if the effluent filter 50 were to become completely clogged, the septic tank's fluid level would typically then rise, causing the scum layer to rise up above the top of the pipe T or sanitary T baffle. Notably, the venting slits 124 may be larger than the second filter zone slits 96 because any debris that does manage to pass through the venting slits 124 in the integral covering panel 120 of the effluent filter will be filtered through the vertical filter slits 118 in the vertical wall member 116. The integral covering panel 120 also has a handle 128 integrally attached thereto, to provide easy means for installing and removing from a septic tank the effluent filter 50 as a one-piece, multi-pass filter unit.

The teeth 126 also provide a user with a ready means for locating the inlet side 52 of the effluent filter 50 to help ensure proper installation of the effluent filter 50 in a septic tank. However, additional indicia may also be provided on the integral covering panel 120 to instruct a user as to how to properly orient the effluent filter 50 during installation, such as the terms "Inlet" on the inlet side 52 of the covering panel and/or "Outlet" on the outlet side 54 of the covering panel, with appropriate directional arrows (not shown).

With reference to FIGS. 8–11, the trajectories of three exemplary particles X, Y, and Z are demonstrated respectively by solid, dash-dotted, and dashed arrow reference lines. The natural tendency of particles in the effluent is to float upward toward the surface, i.e. towards the scum layer. Importantly, the respective filter levels of the effluent filter 50 of the present invention create numerous cross-aligned obstacles, i.e. tortuous paths to minimize the likelihood of unfiltered particles reaching the outlet opening of a T baffle 62 or sanitary T baffle 60. A typical particle's path is shown by the solid arrow line denoted by reference character Z. Particles that successfully pass the angled deflector 70 of level A are then prevented by the wiper blade 80 from bypassing the effluent filter 50. Thus, if such particles are not trapped in a dead zone formed beneath the second angled deflector 72 on the inlet side 52, they pass to the outlet side 54.

Since the natural tendency of particle Z is to float upward, that particle Z is more likely to get trapped in the first zone filtering slits 90 on the outlet side of level C, as shown in FIG. 9. Particle X is shown to have tortuously traveled farther up the effluent filter 50, i.e. particle X passed back to the inlet side 52. That is, particle X has passed up through the quarter circle opening 94 of filter Level C, moved across and back to the outlet side 54, up through the quarter circle opening 92 of filter Level D, then across and back to the inlet side 52, up through the quarter circle opening 94 of Level E, and finally, has been trapped in the first zone filtering slits 90 on the inlet side at filter Level F.

Further, particle Y has followed substantially the same trajectory as particle X, but meandered even farther up the effluent filter 50. That is, instead of getting trapped in the first zone filtering slits of filter Level F, particle Y has passed across and back to the outlet side 54, moved up through the quarter circle opening 92 of level F, traveled across and back to the inlet side 52, up through the quarter circle opening 94 of Level G, and then negotiated the alternating quarter-cylindrical filter steps 100, 102 present on the inlet side 52 of the second filter zone 58. Finally, particle Y has passed back to the outlet side between Levels Q and R and attempted to pass out of the effluent filter 50 by passing through the narrower second zone filtering slits 96 of Level R, as indicated by $Y_1$. Alternatively, if the level of fluid effluent is high enough, the particle Y may even attempt to pass out of the effluent filter 50 by passing through the vertical filter slits 118 in the vertical wall 116, as indicated by $Y_2$.

Countless additional tortuous trajectories are possible through the effluent filter 50 of the present invention. For example, particles that are larger than the second zone filter slits 96, but smaller than the first zone filter slits 90 may pass through the first zone filter slits 90 on either the inlet or outlet sides 52, 54 in the first zone 56, but then later finally become trapped between second zone filter slits 96 of a filter level of the second zone 58, i.e. on either the inlet or outlet side. Particles may also be so shaped that they pass through both first zone filter slits 90 and second zone filter slits 96 in certain orientations, but when rotated, are such that they become trapped between second zone filter slits 96 at yet a higher filter level within the second filter zone 58.

While the present invention has been described with respect to certain specific embodiments thereof, it is not intended to be limited thereto. It is recognized that changes and modifications may be made that are still within the scope of the appended claims.

I claim:

1. An effluent filter comprising:
   a plurality of substantially horizontal filtering levels disposed in a step-wise fashion on both an inlet side and an outlet side of the effluent filter;
   a pair of integral elongated vertical side legs running the length of said effluent filter, and
   means for allowing effluent to pass between said inlet side and said outlet side.

2. The effluent filter of claim 1, further comprising an integral vertical wiper blade extending outwardly from each of said elongated side legs.

3. The effluent filter of claim 2, wherein alternating pairs of adjacent of said substantially horizontal filter levels are connected at an outer edge of said filter levels by vertically oriented wall members, to thereby create a vertical alignment of a plurality of such pairs of connected horizontal filter levels.

4. The effluent filter of claim 3, further comprising an integral horizontal wiper blade extending outwardly from at least one of said wall members.

5. The effluent filter of claim 1, wherein said means for allowing effluent to pass between said inlet side and said outlet side includes vertical filtering wall members.

6. An effluent filter in combination with a pipe T component and an outlet port of a septic tank, said effluent filter including:
   a plurality of stepped filter levels oriented on each of an inlet side and an outlet side of the effluent filter, each of said filter levels having a plurality of slits therein and being oriented at an angle in a range of +45° to −45° with respect to the horizontal plane;
   a vertical boundary separating said inlet side from said outlet side, said vertical boundary being defined by a pair of integral elongated side legs;
   alternating pairs of adjacent said filter levels connected at an outer edge of each of said filter levels by wall members;
   at least one of said wall members having an integral horizontal wiper blade extending outwardly therefrom;
   a vertical filtering wall; and
   means for requiring effluent to pass through at least one of said filter levels and said vertical filtering wall and to meander tortuous paths before reaching said outlet port of the septic tank.

7. A multi-pass effluent filter in combination with a septic system having a septic tank having an outlet opening in a sidewall thereof, a pipe T component having an outlet port in sealed communication with a drainage pipe extending through said outlet opening of the septic tank, and a length of pipe in sealed communication with and extending vertically downwardly from said pipe T Component, the multi-pass effluent filter comprising:
   a generally cylindrically silhouetted effluent filter body member received in said length of pipe and said pipe T component;
   a pair of elongated side legs defining a boundary separating an inlet side from an outlet side of the multi-pass effluent filter;
   an integral vertical wiper blade extending outwardly from each of said elongated side legs and sealingly engaging an inner wall of said length of vertical pipe and an inner wall of said pipe T component;
   a plurality of stepped filter levels on said inlet side and said outlet side, each of said filter levels including a series of generally horizontally-oriented filtering slits, with alternating pairs of said filter levels on said inlet side and said outlet side being connected by wall members provided at an outermost edge of the filter levels; and
   an integral horizontal wiper blade extending outwardly from at least one of said wall members and sealingly engaging said inner wall of the length of vertical pipe.

8. An effluent filter comprising:
   an inlet side including a plurality of stepped inlet side filter levels;
   an outlet side including a plurality of stepped outlet side filter levels;
   each of said stepped inlet side and outlet side filter levels including a plurality of generally horizontally oriented openings;
   a vertical boundary separating said inlet side from said outlet side, said vertical boundary being defined by a pair of integral elongated side legs, and said boundary permitting effluent to pass between said inlet side and said outlet side.

9. The effluent filter of claim 8, further comprising an integral vertical wiper blade extending outwardly from each of said side elongated side legs.

10. The effluent filter of claim 9, wherein alternating pairs of adjacent said filter levels are connected at an outer edge of each of said filter levels by wall members.

11. The effluent filter of claim 10, further comprising an integral horizontal wiper blade extending outwardly from each of said wall members on the inlet side.

12. The effluent filter of claim 11, further comprising an angled deflector plate at a lowermost end thereof.

13. The effluent filter of claim 8, wherein a first filter zone is defined by a lower series of said filter levels having said generally horizontally oriented openings of a first predetermined size, and a second filter zone is defined by an upper series of said filter levels having said generally horizontally oriented openings of a second predetermined size.

14. The effluent filter of claim 13, and wherein said first predetermined size is larger than said second predetermined size.

15. The effluent filter of claim 13 wherein, of the filter levels defining said first filter zone on said inlet side, said connected filter levels alternate between a lower of each pair of said connected filter levels having said generally horizontally oriented openings of said first predetermined size over substantially the entire surface of the filter level, and an upper of each pair of said connected filter levels having said generally horizontally oriented openings of said first predetermined size over substantially half the surface of the filter level with the remaining half of said filter level being substantially open.

16. The effluent filter of claim 13 wherein alternating pairs of adjacent said filter levels are connected at an outer edge of each of said filter levels by wall members and, of the filter levels defining said second filter zone on said inlet side, alternating pairs of said connected filter levels extend from one of said elongated side legs to a mid-plane generally perpendicular to an axis midway between said elongated side legs, and the remaining pairs of connected said filter levels extend from the other of said elongated side legs to said mid-plane.

17. The effluent filter of claim 13 wherein alternating pairs of adjacent said filter levels are connected at an outer edge of each of said filter levels by wall members and, of the filter levels defining said first filter zone on said outlet side, said connected filter levels alternate between a lower of each pair of connected filter levels having said generally horizontally oriented openings of said first predetermined size over substantially the entire surface of the filter level, and an upper of each pair of connected filter levels having said generally horizontally oriented openings of said first predetermined size over substantially half the surface of the filter level with the remaining half of said filter level being substantially open.

18. The effluent filter of claim 13 wherein alternating pairs of adjacent said filter levels are connected at an outer edge of each of said filter levels by wall members and, of the filter levels defining said second filter zone on said outlet side, each filter level extends substantially the entire distance between said elongated side legs and includes said generally horizontally oriented openings of said second predetermined size over substantially the entire surface of the filter level.

19. The effluent filter of claim 18, wherein in said second filter zone, a wall member having a plurality of vertically-oriented openings of at most said second predetermined size extends between one of said elongated side legs and said axis midway between the elongated side legs in the plane of said boundary, one of said wall members being laterally adjacent to each of said connected pairs of filter levels on the inlet side of the second filter zone.

20. The effluent filter of claim 19, wherein the wall members connecting said filter levels on the outlet side of the first filter zone further include integral horizontal wiper blades extending outwardly therefrom.

21. The effluent filter of claim 13, wherein said filter levels in the first filter zone are sloped at alternating angles of ±12° with respect to the horizontal plane.

22. The effluent filter of claim 13, wherein said filter levels in the second filter zone are sloped at angles of ±6° with respect to the horizontal plane.

23. The effluent filter of claim 8, further comprising an integral covering panel member having one or more venting slits therein on the inlet side.

24. The effluent filter of claim 23, further comprising a vertical wall member extending between an uppermost of said filter levels and said covering panel member, said vertical wall member including a plurality of vertically-oriented venting openings therein.

25. The effluent filter of claim 23, further comprising a handle in combination with said covering panel to facilitate installation in, orientation with, and removal of the effluent filter from a septic tank system.

26. The effluent filter of claim 23, further including indicia on said covering panel to facilitate proper orientation of the effluent filter.

27. An effluent filter in combination with a septic system having a septic tank having an outlet opening in a sidewall thereof, a pipe T component having an outlet port in sealed communication with a drainage pipe extending through said outlet opening of the septic tank, and a length of pipe in sealed communication with and extending vertically downwardly from said pipe T component, the multi-pass effluent filter comprising:

a generally cylindrically silhouetted effluent filter body member received in said length of pipe and said pipe T component;

a pair of elongated side legs defining a boundary separating an inlet side from an outlet side of the multi-pass effluent filter;

an integral vertical wiper blade extending outwardly from each of said elongated side legs and sealingly engaging an inner wall of said length of vertical pipe and an inner wall of said pipe T component;

a lowermost first level including a first angled deflector plate extending over substantially the entire outlet side;

a second level spaced vertically above said first level and including a second angled deflector plate extending over substantially the entire inlet side;

a first semi-cylindrical wall member extending between said lowermost first level and said second level on the outlet side of the effluent filter at an outermost edge of said first angled deflector plate;

an integral horizontal wiper blade extending outwardly from said first semi-cylindrical wall member and sealingly engaging said inner wall of the length of vertical pipe; and a plurality of filter levels on said inlet side and outlet side, each of said filter levels including a series of generally horizontally-oriented filtering slits, with alternating pairs of said filter levels on said inlet side and said outlet side being connected by wall members provided at an outermost edge of the filter levels.

28. The effluent filter of claim 26, wherein said pipe T component is a sanitary T baffle.

29. The effluent filter of claim 27, wherein a first filter zone is defined by a lower series of said filter levels having said generally horizontally-oriented filtering slits of a first predetermined size, and a second filter zone is defined by an upper series of said filter levels having said generally horizontally-oriented filtering slits of a second predetermined size.

30. The effluent filter of claim 29, wherein on the outlet side, each pair of said filter levels of the second filter zone has a generally semi-cylindrical profile over a substantial portion of said filter levels and terminates at a flattened distal end wall opposite said elongated side legs, whereby a gap is provided between said distal end wall and either of said length of pipe or said pipe T, through which effluent can bypass said pair of filter levels in the event said filter levels become clogged.

31. The effluent filter of claim 29, wherein said filter levels in the first filter zone are sloped at alternating angles in a range from ±1° to ±45° with respect to the horizontal plane.

32. The effluent filter of claim 29, wherein said filter levels in the first filter zone are sloped at alternating angles of ±12° with respect to the horizontal plane.

33. The effluent filter of claim 29, wherein said filter levels in the second filter zone are sloped at alternating angles in a range from ±1° to ±45° with respect to the horizontal plane.

34. The effluent filter of claim 29, wherein said filter levels in the second filter zone are sloped at angles of ±6° with respect to the horizontal plane.

35. The effluent filter of claim 27, wherein each of said generally horizontally-oriented filtering slits terminates in a generally vertically-oriented filtering slit in said wall member provided at the outermost edge of the associated filter level.

36. The effluent filter of claim 27, wherein said effluent filter body member is flexible.

* * * * *